United States Patent
Bornemann

[11] 3,771,594
[45] Nov. 13, 1973

[54] MIXER
[75] Inventor: Joachim Bornemann, Vellmar, Germany
[73] Assignee: Rheinstahl Aktiengellschaft, Essen, Germany
[22] Filed: Dec. 1, 1971
[21] Appl. No.: 203,637

[52] U.S. Cl.............. 165/109, 165/75, 165/96, 259/95, 259/DIG. 18
[51] Int. Cl............................................ F28f 13/12
[58] Field of Search........................ 165/109, 108; 259/95

[56] References Cited
UNITED STATES PATENTS
3,387,651  6/1968  Berker................................ 165/109
2,461,746  2/1949  Lathrop et al..................... 259/95 X
2,520,827  8/1950  Beken.................................. 259/95
2,963,281  12/1960  Reiffen............................... 259/95

FOREIGN PATENTS OR APPLICATIONS
666,981  11/1938  Germany............................. 165/108
545,286  2/1932  Germany............................. 165/109

Primary Examiner—Albert W. Davis, Jr.
Attorney—Walter Becker

[57] ABSTRACT

A mixer adapted to be heated and cooled, especially for use in connection with the preparation and refining of synthetic materials, which comprises a double-walled container having coaxially arranged therein a truncated cone-shaped insert open at the top and bottom and in spaced relationship to the inside of the container while the smallest diameter of the insert is closest to the bottom, the insert being double-walled so as to define passage means for passage therethrough of a cooling or heating medium and also being adjustable as to the spacing of the insert relative to the container bottom.

4 Claims, 1 Drawing Figure

Patented Nov. 13, 1973     3,771,594
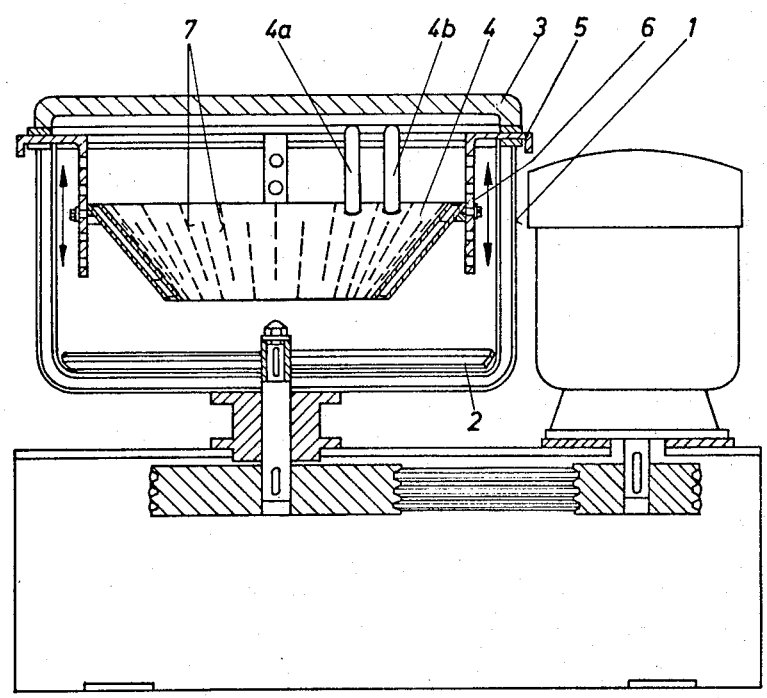

MIXER

The present invention relates to a mixer for preparing synthetic materials, which comprises primarily a double-walled cylindrical container which is adapted to be closed by a cover and in which coaxially with the vertical container axis and in spaced relationship to the container wall there is mounted a double-walled insert ring for the passage of a heating or cooling medium while on the bottom side of the container there is provided a mixing tool which rotates at a high speed and extends up to the container wall.

With heating and cooling mixers of this type, double-walled insert members for the throughflow of the heating or cooling medium are necessary in order, during the preparation of synthetic materials, to be able to more quickly cool the respective mixture and thereby to increase the throughflow quantity through the mixer.

It has been suggested heretofore, in double-walled heatable mixers parallel to the container mantle to arrange one or two coaxial double-walled flat rings which are passed through by the respective heating or cooling medium while the materials to be mixed are passed through between these rings. Such cylindrical inserts have the drawback that the contact of the materials to be mixed with the vertical surfaces is undefined during the upward movement of the material and that the contact may vary between a full contact during the accumulation of material or the formation of lumps and an uncontrolled contact when the material passes by these surfaces at a high speed. Moreover, such cylindrical inserts require a mixing tool which is specifically designed and arranged for the upward feeding of the materials to be mixed. These heretofore known fixed cylindrical inserts have the further drawback that they make the cleaning of the mixer rather difficult.

It is, therefore, an object of the present invention so to design the shape and the arrangement of the additional inserts with their connections to the heating or cooling medium that the respective mixture can rotate or circulate in the mixing container without accumulation and is guided over the inserts at a uniform contact so that the heat can be uniformly withdrawn.

This object and other objects and advantages of the invention will appear more clearly from the following specification in connection with the accompanying drawing illustrating a section through the mixer according to the present invention.

The mixer according to the present invention is characterized primarily in that the insert ring forms a truncated cone-shaped mantle ring having its smaller opening directed downwardly and is adjustably connected as to height to a plurality of substantially vertically extending perforated rails or strips which are fixedly connected to a detachable ring arranged between the wall and the cover of the container.

In order to prevent a depositing or collecting of the mixture on the inner surface of the truncated cone-shaped mantle ring, it is, in conformity with a further feature of the invention, provided that the mantle lines of the mantle ring define with the horizontal plane an angle of from 40° to 60° while the diameter of the smaller opening of the mantle ring corresponds approximately to half the diameter of the container.

Referring now to the drawing in detail, the container 1 has arranged at the bottom thereof a rotatable tool 2, said container being a double-walled container. In spaced relationship to the bottom and to the wall as well as to the cover 3 of the container 1 there is coaxially arranged with regard to the container axis a double-walled truncated cone-shaped mantle ring 4. This ring 4 is at its circumference detachably connected to at least three narrow rails or strips 6 so as to be variable as to height above the container bottom. These rails or strips 6 extend substantially vertically into the interior of the container and are connected to a holding ring 5 arranged between the cover 3 and the container 1. The top portion of the mantle ring 4 has connections 4a and 4b for the inlet and outlet respectively of a heating or cooling medium. The shape of the truncated cone-shaped mantle ring 4 is so selected that the mantle line of the mantle ring defines with the horizontal plane an angle within the range of from 40° to 60°, preferably an angle of 50°. The diameter of the lower smaller opening of the mantle ring 4 amounts to about 0.5 times the inner diameter of the container 1. Within the double-walled mantle ring 4 there are provided guiding strips 7 which so to speak radiate from wall to wall and are alternately offset as to height. The length of these guiding strips 7 is shorter than the mantle line between the upper and lower mantle ring end face. In this way a forced guiding of the heating or cooling medium and thereby a more uniform heat transfer will be assured.

The materials to be mixed are by the tool on the bottom side of the container, which tool may be of any suitable design, thrown outwardly against the container wall, then rise on the container wall, and after having passed through the gap between the container wall and the upper funnel edge are by the holding ring 5 directed toward the interior and finally slide over the inner funner surface of the mantle ring 4 back to the rotating tool from where they are again accelerated for further circulation. The adjustability as to height of the mantle ring 4 makes it possible to adapt the position of the insert to the flow behavior and the quantity of the respective mass to be worked while the suitable location can always be ascertained by tests.

The advantages obtained by the present invention consist primarily in that the materials to be mixed are in uniform contact passed over the additional heating or cooling surfaces and can thus more uniformly and at a higher speed be exposed to the desired temperature change, for instance cooling, while any accumulation will be avoided. The installation and withdrawal as well as the cleaning of the additional heating or cooling surfaces can be carried out with a minimum of effort and in a minimum of time.

It is, of course, to be understood that the present invention is, by no means, limited to the particular showing in the drawing but also comprises any modifications within the scope of the appended claims.

I claim:

1. A mixer for use in a combination relative to a mixture adapted to be heated and cooled, especially for cooling use in connection with the preparation and refining of synthetic materials, which includes: a double-walled container including a bottom, cover means for selectively closing and opening said container, a ring-shaped insert member having double walls defining passage means and being substantially coaxial with and suspended in said container in spaced relationship to the inner wall including the bottom of said container, said insert member being of truncated cone-shaped form open at the top and bottom and having its largest diameter remote from said bottom, the mantle lines of said truncated cone-shaped insert member define with the plane which is perpendicular to the axis of said insert member an angle within the range of from 40° to 60° to assure longer dwell time, conduit means communicating with said passage means for selectively passing fluid means into and withdrawing fluid means from said passage means, and agitating means rotatably arranged adjacent said bottom and between the latter and the smallest diameter section of said insert member and radially extending near to the inner wall of said container, there being good definite contact of mixture material to be cooled inside the container and especially upwardly with dwell for improved heat transfer along underside of said insert member during rising of the mixture material flow as a consequence of centrifugal force generated by said agitating means.

2. A mixer according to claim 1, in which said container is cylindrical between bottom and cover means.

3. A mixer according to claim 2, which includes ring means removably inserted between said cover means and said container and having arm means extending into said container and adjustably supporting said insert member for selectively varying the height spacing of said insert member relative to said bottom and said cover means.

4. A mixer according to claim 1, in which the smallest inner diameter of said insert member equals approximately one half the inner diameter of said container.

* * * * *